United States Patent
Romanelli et al.

(10) Patent No.: US 7,364,206 B2
(45) Date of Patent: Apr. 29, 2008

(54) COMPRESSION FITTING FOR PIPES

(76) Inventors: Antonio Romanelli, Via Adolfo Omodeo 123, 80128 Napoli NA (IT); Carmine Romanelli, Via Adolfo Omodeo 120, 80128 Napoli NA (IT); Mario Romanelli, Via Adolfo Omodeo 115, 80128 Napoli NA (IT)

( * ) Notice: Subject to any disclaimer, the term of this patent is extended or adjusted under 35 U.S.C. 154(b) by 24 days.

(21) Appl. No.: 10/540,964

(22) PCT Filed: Dec. 17, 2003

(86) PCT No.: PCT/EP03/14367

§ 371 (c)(1),
(2), (4) Date: Jun. 28, 2005

(87) PCT Pub. No.: WO2004/063615

PCT Pub. Date: Jul. 29, 2004

(65) Prior Publication Data

US 2006/0071469 A1   Apr. 6, 2006

(30) Foreign Application Priority Data

Jan. 8, 2003   (IT)   .................... MI2003A0010

(51) Int. Cl.
*F16L 33/00*   (2006.01)
(52) U.S. Cl. ..................................... 285/256
(58) Field of Classification Search ................ 285/256
See application file for complete search history.

(56) References Cited

U.S. PATENT DOCUMENTS

| | | | | |
|---|---|---|---|---|
| 4,106,526 A | * | 8/1978 | Szentmihaly | 285/256 |
| 4,407,532 A | * | 10/1983 | Patel et al. | 285/256 |
| 4,990,106 A | * | 2/1991 | Szegda | 439/585 |
| 5,456,914 A | * | 10/1995 | Stine et al. | 424/256.1 |
| 5,829,795 A | | 11/1998 | Riesselmann | |
| 6,523,862 B1 | * | 2/2003 | MacDuff | 285/256 |
| 6,598,905 B2 | * | 7/2003 | Campbell et al. | 285/256 |

FOREIGN PATENT DOCUMENTS

| | | |
|---|---|---|
| AU | 510400 | 10/1979 |
| DE | 101 37 078 C1 | 1/2003 |
| EP | 1 134 473 A1 | 9/2001 |
| FR | 54 476 | 5/1950 |
| GB | 1 440 084 | 6/1976 |
| WO | WO 95/26480 | 10/1995 |

* cited by examiner

*Primary Examiner*—David Bochna
(74) *Attorney, Agent, or Firm*—McGlew and Tuttle P.C.

(57) ABSTRACT

A compression fitting for rigid or semi-rigid pipes comprising an internal element 11 onto which the pipe 12 is fitted and into which at least one circumferential groove 13 is machined and an external sleeve 20 usually cylindrical is positioned around the pipe and intended to be deformed by radial compression to push the wall of the pipe inside said groove. The external wall of the sleeve 20 bears a circumferential protruding bead 22 in line with its area which is found in line with the groove of the internal element with interposition of the wall of the pipe, so that the compression of the sleeve by action of a cylindrical pressing wall 30 acts on the bead to deform the sleeve with the purpose of pushing the wall of the pipe inside the groove of the internal element.

12 Claims, 2 Drawing Sheets

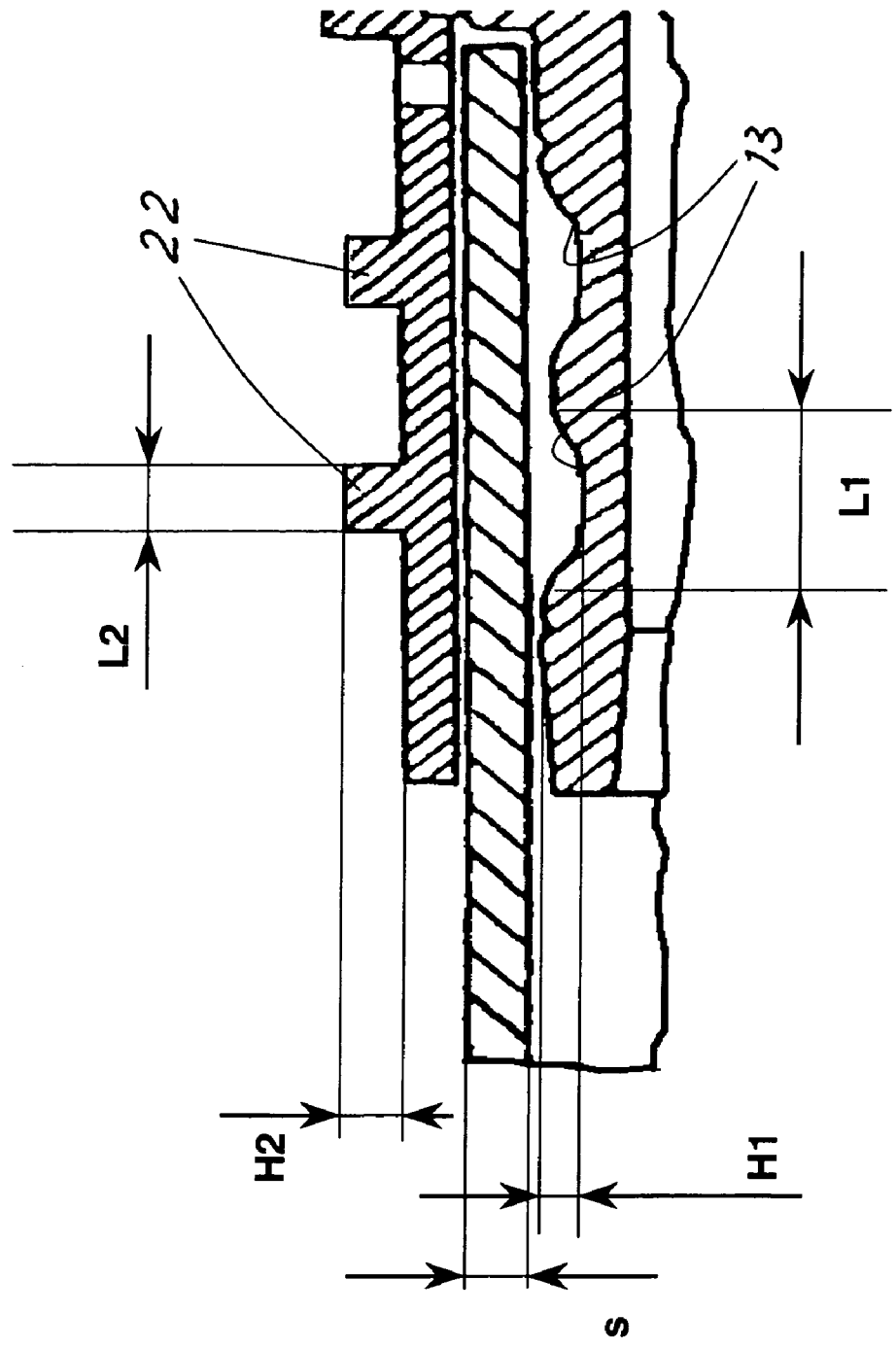

COMPRESSION FITTING FOR PIPES

CROSS REFERENCE TO RELATED APPLICATIONS

This application is a United States National Phase application of International Application PCT/EP03/14367 and claims the benefit of priority under 35 U.S.C. § 119 of MI2003A 000010 filed Jan. 8, 2003, the entire contents of which are incorporated herein by reference.

FIELD OF THE INVENTION

The present invention pertains to a compression fitting for pipes.

BACKGROUND OF THE INVENTION

The fastening of the extremity of a pipe to a hydraulic connection terminal body, fitting the extremity onto an internal cylindrical element, then pressing the pipe on said element by means of radial deformation of an external sleeve is known.

If the pipe is made in a pliable material, such as a plastic material, the use of an internal element generally cylindrical is known whose external surface has successive ridges and ring-like grooves. The pressure of the pipe on this sleeve deforms the material of the pipe making said ridges penetrate into the material itself, with effective hydraulic seal action.

When the fitting is intended to receive rigid or semi-rigid pipes, in plastic, metal or multi-layer metal and plastic, a problem is constituted by the need to achieve efficient resistance both to the withdrawal mechanical stress and to the hydraulic leakages, which is also reliable over its service life. The deformation of the external sleeve proves to be easier and can be deeper, if it is carried out in correspondence with discrete circumferential areas, so as to form deformed ring areas to assume a reduced diameter.

The present invention therefore concerns that type of fitting in which the whole section of the rigid or semirigid pipe is deformed because the pipe follows the path of the internal sleeve that is not generically cylindrical, but has at least one section with a heavily reduced diameter into which the pipe is forced to penetrate by deformation of its entire section, in the sense of reducing the diameter.

According to the known technique, in this type of fitting the internal element is fitted with circumferential grooves corresponding in position to the areas of the sleeve that are intended to be deformed. The deformation of the pipe, so that it takes on such a path that adheres to the internal element also in the areas with reduced diameter is obtained by means of deformation of an external sleeve fitted onto the pipe. The sleeve is deformed by means of a semi-circular jaw clamp with configuration corresponding to that of the sleeve, fitted with protruding circumferential beads, to compress and selectively deform the desired areas of the sleeve, in correspondence of the areas of the pipe that have to be deformed with diameter reduction to penetrate the reduced diameter areas of the internal element.

With such a known configuration of parts, between internal element and sleeve a winding path seat is formed within which the pipe is received and pressed, with good resistance to withdrawal, because of the deep deformation to which the diameter of the pipe itself is subject in limited areas.

Joints of the type described are known in numerous variants, and are for example shown in U.S. Pat. No. 5,829,795.

A serious inconvenience that is presented by this type of pressure joint known is constituted by the fact that their reliability is determined by the precision with which the sleeve pressed, in relation the configuration the internal element onto which the pipe is fitted.

In fact the beads of the deformation collet of the sleeve are required to act in correspondence with the grooves of the internal element, to obtain the desired effect.

Nevertheless, the application of these fittings to the extremity of a pipe can also be carried out in the formation of plants on the installation site and therefore not in the workshop where the operator can work at ease. In awkward conditions it may happen that the operator does not apply the tightening jaws in axially correct position on the external sleeve so that it is deformed in axially incorrect positions, and the grooves formed in the sleeve by the beads of the jaws do not correspond with sufficient precision to the grooves of the internal element, seriously compromising the formation of the joint, without the possibility of successive corrections of the incorrect deformation.

Proposal has also been made to define the sleeve areas that are subject to maximum pressure by a deformation collet by making slight protrusions on the external surface of the sleeve situated in correspondence of areas where maximum pressure on the pipe is required, to push it against a corresponding area of the internal element, as shown in DE 101 37 078. In this manner the result is that there are areas of the pipe that are more compressed so that the plastic material that constitutes the wall of the pipe, or at least its external layer, is deformed locally altering the thickness of the pipe and causing the insertion of the material in said seats for elastic gaskets of a generically cylindrical internal element of the fitting. The requirement in this document is that excessive diametric deformation of the pipe is avoided so as not to damage elastic gasket elements, while according to the aims of the invention the contrary is required, that is that the pipe is deeply deformed in the sense of locally diminishing its diameter, to reach a winding path that adapts to an internal element that has wide and deep grooves, to anchor mechanically against withdrawal.

SUMMARY OF THE INVENTION

The aim of the present invention is to obviate the inconveniences of the known technique and to produce a pressure joint that is highly reliable both for mechanical resistance against withdrawal and for hydraulic seal, suitable for pipes with relatively rigid wall in metal or in layers of plastic material and metal, and with improved facility of installation.

In accordance with the invention, the pressure fitting for rigid or semi-rigid pipes in metal, rigid plastic material (such as reticular polythene) or metal-plastic multi-layer, comprises an internal element on which the pipe is fitted and into which at least one circumferential groove is machined and an external sleeve usually cylindrical is positioned around the portion of pipe fitted on the internal element and intended to be deformed by radial compression to deform the pipe so as to make its wall adhere to the bottom of the groove, and is characterized in that the width of said groove on the internal element is greater than the thickness of the pipe and its maximum depth is equal to at least a quarter of the thickness of the pipe, and that the external wall of the sleeve has a circumferential protruding bead in line with its area which is found in correspondence with the groove of the internal element with interposition of the wall of the pipe, the width of said groove being less than the width of the groove of the internal element and height greater than the depth of the groove, so that the compression of the sleeve by action of a cylindrical wall radially pushing acts on the grooving to deform the sleeve in the sense of deforming the wall of the pipe to penetrate said groove of the internal element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 shows an axial section view similar to that of FIG. 2, showing enlarged detail;

DESCRIPTION OF THE PREFERRED EMBODIMENTS

Figure 1:
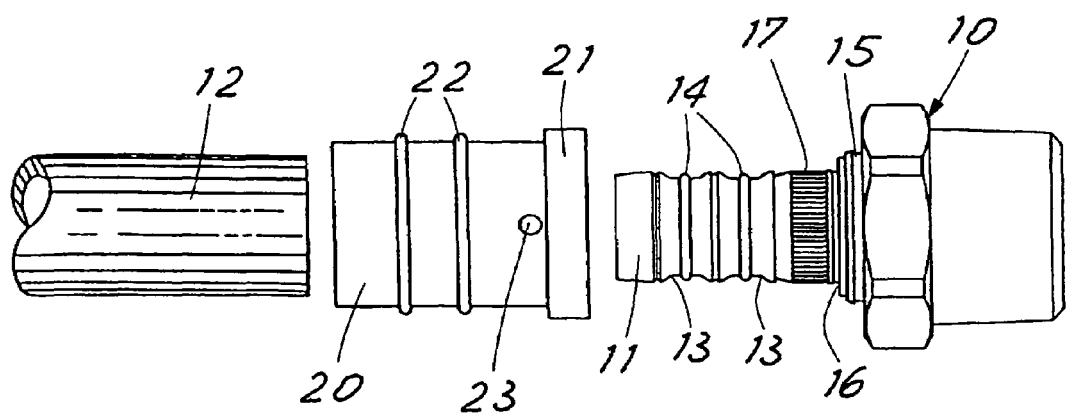
FIG. 1 shows a detailed view of the fitting.

Referring to the drawings in particular, FIG. 1, the fitting in accordance with the invention comprises a body generically indicated with 10, of any configuration desired to be connected to another element that is not shown of a hydraulic plant.

The element 11, onto which pipe 12 is intended to be fitted, comes out of the generic body 10. Element 11 presents a suitable number of grooves 13, in the example two.

Figure 2:
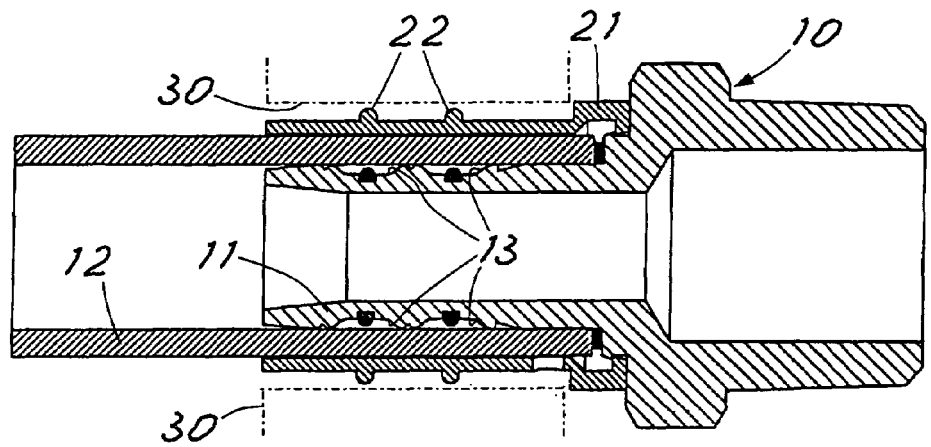
FIG. 2 shows an axial section view of the fitting before the deformation.

A sleeve 20 is also provided which is intended to be inserted around the pipe fitted onto the element 11 until it comes up against a shoulder 16, as can be seen in FIG. 2.

Preferably, but not necessarily, an edge of the sleeve has a temporary holding axial coupling 21 on a complementary seat 15 of the corresponding extremity of the element 11. This coupling can be of simple interference with limited pressure, or the claw, filet, bayonet or similar type, and it is useful to fix the position of the sleeve when presetting the joint, so that accidental movements cannot occur too easily. Protruding beads 22 are machined on the external surface of the sleeve 20, which come into alignment with grooves 13 of the internal element when the parts of the joint are assembled, as shown in FIG. 2. In any case the elements 15 and 21 must define the limit position of the sliding of the sleeve in such a position that the protruding beads 22 and the grooves 13 come into mutual alignment.

The forced pre-assembly of the sleeve 20 enables the installer to fit the pipe onto the element 11 without having to pay attention to the correct axial alignment of the parts to align the protruding bead 22 with the grooves 13.

One or more radial holes 23 can be made in the sleeve, through which the pipe fitted onto the joint can be seen. The operator can, therefore, be sure that the pipe has been completely fitted onto the internal element by seeing the wall of the pipe through said hole 23.

Should good anchorage on the internal element be required of the pipe also in relation to possible movements of mutual rotation, a circumferential band 17 is made on element 11 with surface machining creating roughness, for example direct tooth reeding like the generators of the element.

When the parts of the fitting are assembled as in FIG. 2, a radial pressure is exerted on the sleeve, by means of jaws with usually cylindrical surfaces, schematized with 30 in FIG. 2. Tools of this kind, manual or motorized, are well known and require no illustration.

Figure 4:
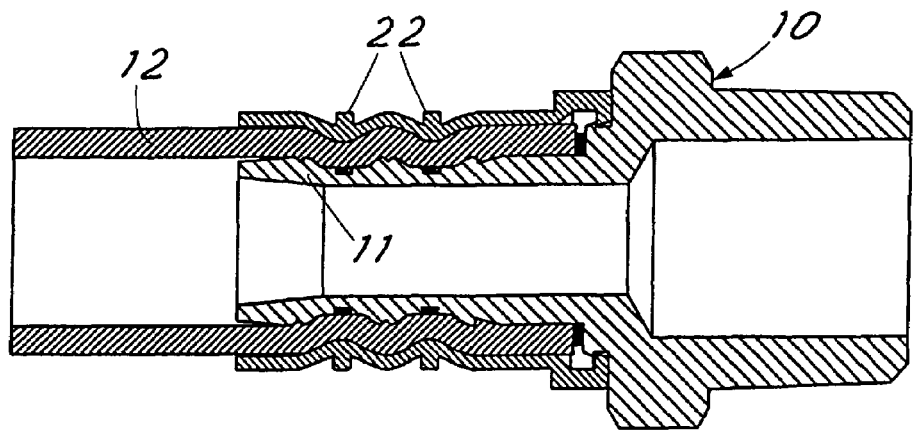
FIG. 4 shows a view in section like that shown in FIG. 2 after the final tightening action of the fitting has been applied.

Because of the presence of the beads 22, the sleeve receives a deforming action differentiated by the clamp tool, concentrated where said beads are present, so that the sleeve deforms the wall of the pipe 12 to penetrate the grooves 13 that are aligned with the beads 22, as shown in FIG. 4. In this manner the pipe is positioned and held with a winding path between the element 11 and the sleeve 20, permanently deformed and with excellent axial hold.

The controlled deformation of the sleeve, in accordance with the aims of the invention, is not influenced by the exact axial positioning of the tool used for its radial compression.

FIG. 3 shows an enlarged detail of the section of FIG. 2 where details have been neglected, such as the elastic gaskets and their seats, for representation clarity, of important dimensions of parts of the fitting. The width L1 of each groove 13 must be greater than the thickness s of the pipe to which the fitting is intended, which is usually slightly less than the distance between the cylindrical wrapper surface of the external surface of the element 11 and the internal surface of the sleeve 20 before the deformation. Preferably, L1 is greater than 1.5 s.

The depth H1 of the groove 13 will have to be at least equal to 0.25 the thickness s of the pipe.

The width L2 of the protrusion 22 must be less than the width L1 of the opposite groove 13 and the height H2 equal to or greater than the height H1 of the groove. It has been found that it must be verified that H2 is between the interval 1÷1.5 H1, preferably around 1.3 H1.

The dimensional ratios specified above originate from the requirement, according to the aims of the invention, that the pipe can be deformed radially to take on a winding path by deformation of the sleeve 20, without however excessive localized pressures being created that deform the pipe in the sense of excessively lessening the thickness.

For this reason, for example, its is essential that the width of the ring-like protrusions 22 of the sleeve is lower than the width of the corresponding grooves 13, so that the material of the sleeve moved by the pressure on the protrusions can operate on a section of pipe that can be deformed with reduction of the average diameter so that it is accepted by the grooves.

The adoption of these dimensional parameters make the fitting suitable for use with pipes in material that is also lightly pliable, for example in copper or in a plastic material with high rigidity, also stratified with metal.

At the bottom of each groove a seat can be obtained where an elastic gasket 14, typically the O-ring type is arranged that protrudes out of the groove to exert an additional seal action when the pipe is deformed to take on the form of the groove thus compressing the gasket.

The materials that can be used for making the joint are variably chosen by the technician, in accordance with the functional requirements of the various parts.

The internal element 11 can be metal, for example in brass, or in plastic material with suitable mechanical characteristics.

Should the element 11 be in metal and the pipe 12 be of the multi-layer type with metal core, it is advisable to insert an insulating gasket 18 between the head of the pipe and the shoulder 16, to prevent corrosive phenomena of an electrochemical nature.

The sleeve 20 will be made generally in a metallic material, with suitable plastic deformation characteristics, such as annealed brass.

While specific embodiments of the invention have been shown and described in detail to illustrate the application of the principles of the invention, it will be understood that the invention may be embodied otherwise without departing from such principles.

The invention claimed is:

1. A compression fitting for rigid or semi-rigid pipes composed of metal, rigid plastic material, or metal-plastic multi-layer, the compression fitting comprising:
    an internal element onto which a pipe having a pipe wall is fitted, said internal element having a plurality of axially spaced circumferential grooves, wherein a bottom of each groove defines a seat in which an elastic seal ring gasket is positioned, said internal element having an external surface;
    an external sleeve having a substantially cylindrical shape with a cylindrical inner surface and an external surface for positioning around a portion of pipe fitted on the internal element and for radial compression such that said external sleeve deforms the pipe, whereby the pipe wall adheres to the bottom of the grooves, wherein the width of each of said grooves is greater than the thickness of the pipe wall and maximum depth of each of said grooves is equal to at least a quarter of the thickness of the pipe wall, said external surface of the external sleeve comprising circumferential protruding beads, each of said beads being aligned with each groove of said internal element with the pipe wall located between said internal element and said external sleeve, the width of each of said beads being less than the width of each of the grooves of the internal element and the height of each of said beads being at least equal to the depth of each of the grooves, each of said beads receiving radial compression via a cylindrical wall such that each of said beads deforms the external sleeve with respect to its cylindrical shape, whereby portions of said cylindrical inner surface of said external sleeve has a reduced internal diameter, said cylindrical inner surface of said external sleeve and said external surface of said internal element being in contact with the pipe, said external sleeve radially deforming the pipe wall to penetrate said grooves such that thickness of said pipe wall is not substantially reduced.

2. A fitting according to claim 1, wherein the height of the bead is between 1 and 1.5 times the depth of the groove.

3. A fitting in accordance with claim 1, wherein the width of the groove is about 1.5 times the thickness of the pipe.

4. A fitting in accordance with claim 1, wherein a plurality of grooves are axially spaced along the internal element.

5. A fitting in accordance with claim 1, wherein axial holding means of the extremity of the sleeve with the internal element are provided, to identify their mutual positioning.

6. A fitting in accordance with claim 1, wherein the height of said bead is 1.3 times the depth of the groove.

7. A method for producing compression fittings, the method comprising:
    providing an internal element having an external surface, said external surface defining at least one circumferential groove, said groove having a defined center point;
    connecting a pipe to said internal element, said pipe having a defined pipe wall;
    connecting an external sleeve to said pipe, said external sleeve having a defined inner cylindrical surface and a defined external cylindrical surface, said pipe being arranged between said inner cylindrical surface of said external sleeve and said external surface of said internal element, said pipe engaging said inner cylindrical surface of said external sleeve and said external surface of said internal element, said external cylindrical surface of said external sleeve defining a circumferential protruding bead, said bead being located opposite said groove such that said bead is aligned with said center point of said groove, in an area corresponding with said groove, width of said groove being greater than thickness of said pipe wall, said groove having a maximum depth at least equal to a quarter of the thickness of said pipe wall, width of said bead being less than width of said groove, height of said bead being at least equal to the depth of said groove;
    compressing said bead such that said external sleeve is deformed, whereby a portion of said cylindrical surface of said external sleeve deforms said pipe wall, said pipe wall engaging said groove to connect said pipe to said internal element.

8. A fitting in accordance with claim 7, wherein a portion of said external sleeve engages said internal element.

9. A fitting in accordance with claim 7, wherein the height of the bead is between 1 and 1.5 times the depth of the groove.

10. A fitting in accordance with claim 7, wherein the width of the groove is about 1.5 times the thickness of the pipe.

11. A fitting in accordance with claim 7, wherein a plurality of grooves are axially spaced along the internal element.

12. A fitting in accordance with claim 7, wherein a seat is made at the bottom of the groove, in which an elastic seal ring gasket is positioned.

* * * * *